United States Patent
Jeon

(10) Patent No.: US 9,330,319 B2
(45) Date of Patent: May 3, 2016

(54) APPARATUS FOR COMPENSATING CAMERA IMAGE AND OPERATING METHOD THEREOF

(71) Applicant: HYUNDAI MOBIS Co., Ltd., Yongin-si, Gyeonggi-do (KR)

(72) Inventor: Mi Jin Jeon, Yongin-si (KR)

(73) Assignee: HYUNDAI MOBIS Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/525,253

(22) Filed: Oct. 28, 2014

(65) Prior Publication Data
US 2015/0139556 A1 May 21, 2015

(30) Foreign Application Priority Data
Nov. 21, 2013 (KR) .......... 10-2013-0141829

(51) Int. Cl.
*G06K 9/68* (2006.01)
*G06K 9/00* (2006.01)
*G06T 7/00* (2006.01)

(52) U.S. Cl.
CPC .......... *G06K 9/00791* (2013.01); *G06T 7/0042* (2013.01); *G06T 2207/30244* (2013.01); *G06T 2207/30252* (2013.01)

(58) Field of Classification Search
USPC ......... 382/115, 116, 124, 209, 218; 340/5.53, 340/5.83
See application file for complete search history.

(56) References Cited

U.S. PATENT DOCUMENTS

| | | | | |
|---|---|---|---|---|
| 5,509,082 A * | 4/1996 | Toyama | .................. | G08G 1/04 340/917 |
| 6,234,690 B1 * | 5/2001 | Lemieux | ................ | F16M 11/04 248/187.1 |
| 7,212,653 B2 * | 5/2007 | Sato | ........................ | H04N 7/183 348/E7.087 |
| 7,630,804 B2 * | 12/2009 | Aoki | .................. | G06K 9/00201 180/271 |
| 7,995,510 B2 * | 8/2011 | Gao | .................... | H04W 76/002 370/312 |
| 8,350,909 B2 * | 1/2013 | Mori | ........................ | B60R 1/00 348/143 |
| 8,401,305 B2 * | 3/2013 | Kido | .................... | G06K 9/6253 382/199 |
| 8,665,332 B2 * | 3/2014 | DePaschoal | ............ | B60R 11/04 348/148 |
| 8,723,642 B2 * | 5/2014 | Park | ...................... | G07F 15/006 320/103 |
| 8,811,948 B2 * | 8/2014 | Bandyopadhyay | ... | G06F 1/1643 345/173 |

FOREIGN PATENT DOCUMENTS

KR   10-2013-0025005 A   3/2013

* cited by examiner

*Primary Examiner* — Yosef Kassa
(74) *Attorney, Agent, or Firm* — Paratus Law Group, PLLC

(57) ABSTRACT

Disclosed is a camera image compensating apparatus for a vehicle, including a detecting unit which detects a base line and a vehicle body contour line; a coordinate storing unit which stores a first reference image coordinate value and a second reference image coordinate value; a first coordinate calculating unit which calculates a first base line image coordinate value and calculates a first vehicle body contour line image coordinate value; a coordinate comparing unit which compares the first reference image coordinate value and the first base line image coordinate value and compares the second reference image coordinate value and the first vehicle body contour line image coordinate value; and a correcting unit which calculates angle change information of the camera, calculates correction information based on the angle change information, and corrects the camera parameter using the correction information.

14 Claims, 7 Drawing Sheets

APPARATUS FOR COMPENSATING CAMERA IMAGE AND OPERATING METHOD THEREOF

CROSS REFERENCE TO PRIOR APPLICATIONS

The present application claims priority under 35 U.S.C. §119 to Korean Patent Application No. 10-2013-0141829 (filed on Nov. 21, 2013), which is hereby incorporated by reference in its entirety.

BACKGROUND

The present invention relates to an image compensating apparatus and an operating method thereof, and more particularly, to a camera image compensating apparatus for a vehicle which calculates whether a mounting state of the camera which is provided in the vehicle is changed and a changing degree to compensate for a camera parameter so that a camera image is constantly maintained without being affected by a mounting position and a changed angle of the camera and an operating method thereof.

Generally, most drivers operate a vehicle while directly checking surroundings of the vehicle with the naked eyes or checking obstacles at sides or a rear side of the vehicle using side mirrors.

However, there may be a blind spot where an appropriate view is not secured by only viewing with the naked eyes or the side mirrors, depending on a kind of vehicle, a size of the vehicle or surrounding circumstances where the vehicle is located.

Specifically, in the case of a large size vehicle, there is a region which is not checked only by the side mirrors, so that in order to prevent an accident which may cause human or property loss from happening, the driver needs to directly check whether there is an obstacle by looking around the vehicle by the naked eyes before getting into the vehicle, which may cause inconvenience.

As a technology which may relieve such inconvenience, recently, an around view monitoring (AVM) system which displays images of individual channels which are transmitted from cameras mounted in the vehicle or an around view obtained by composing the images for the driver or a mirrorless system in which side mirrors are replaced with a camera to reduce air resistance and provide left, right, and rear side images of the vehicle to the driver has become commercialized.

However, the mounting state of the cameras which are utilized for the AVM system or the mirrorless system may be changed due to various circumstances, in some cases. When the mounting state of the camera is changed, an image which is provided to the driver inevitably includes information which is very far from the actual state, so that erroneous information related with the parking or driving may be created or no information may be created.

Patent Document: Korean Unexamined Patent Application Publication No. 10-2013-0025005 (published on Aug. 30, 2011)

SUMMARY

The present invention has been made in an effort to provide a camera image compensating apparatus for a vehicle which calculates whether a mounting state of the camera which is provided in the vehicle is changed and change information to compensate for a camera parameter to provide image information which is appropriate for a driving situation to the driver and an operating method thereof.

Objects of the present invention are not limited to the above-mentioned objects, and other objects, which are not mentioned above, can be clearly understood by those skilled in the art from the following descriptions.

An exemplary embodiment of the present invention provides a camera image compensating apparatus for a vehicle, including: a detecting unit which detects a base line and a vehicle body contour line by analyzing an image signal which is created by a camera which uses a first camera parameter; a coordinate storing unit which stores a first reference image coordinate value and a second reference image coordinate value; a first coordinate calculating unit which calculates a first base line image coordinate value with respect to the base line and calculates a first vehicle body contour line image coordinate value with respect to the vehicle body contour line; a coordinate comparing unit which compares the first reference image coordinate value and the first base line image coordinate value to calculate a first comparison result and compares the second reference image coordinate value and the first vehicle body contour line image coordinate value to calculate a second comparison result; and a correcting unit which calculates angle change information of the camera based on the first and second comparison results, calculates correction information based on the angle change information, and calculates a second camera parameter by applying the correction information to the first camera parameter.

Another exemplary embodiment of the present invention provides an operating method of a camera image compensating apparatus for a vehicle, including: detecting a base line and a vehicle body contour line by analyzing an image signal which is created by a camera which uses a first camera parameter; calculating a first base line image coordinate value with respect to the base line and calculating a first vehicle body contour line image coordinate value with respect to the vehicle body contour line; comparing a first reference image coordinate value which has been stored in advance with the first base line image coordinate value to calculate a first comparison result and comparing a second reference image coordinate value which has been stored in advance with the first vehicle body contour line image coordinate value to calculate a second comparison result; calculating angle change information of the camera based on the first and second comparison results; and calculating a second camera parameter by applying the correction information corresponding to the angle change information to the first camera parameter.

According to the camera image compensating apparatus for a vehicle and the operating method thereof according to the exemplary embodiment of the present invention, whether the mounting state of the camera which is provided in the vehicle is changed and change information are calculated to compensate for the camera parameter, thereby providing image information which is appropriate for a driving situation to the driver.

When a parking operation which is required to be precisely performed is performed, a front side image, side images, or a rear side image which conform with an actual visibility are provided to the driver so that human/property loss may be reduced.

Reliability of information which is provided from the AVM system or a parking assistance system which is controlled based on an image signal which is obtained through the camera may be improved.

The effects of the present invention are not limited to the aforementioned effects, and other effects, which are not men-

DETAILED DESCRIPTION

Figure 1B:
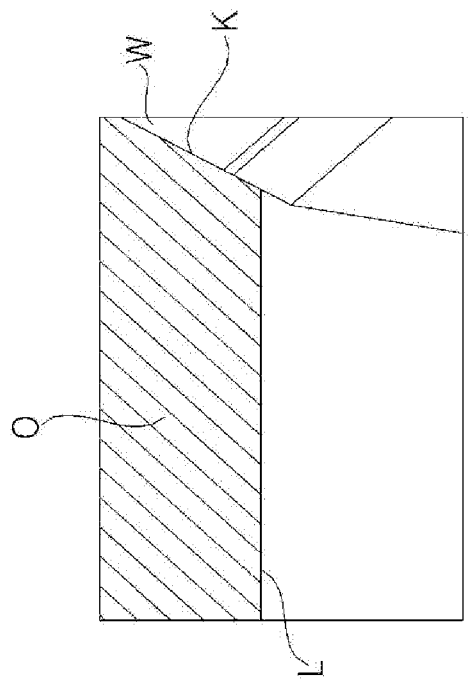
FIGS. 1A-1B illustrate an example of a vehicle, a mounting position of a camera, and an image which is captured by the camera according to an exemplary embodiment of the present invention.

Advantages and characteristics of the present invention, and a method of achieving the advantages and characteristics will be clear by referring to exemplary embodiments described below in detail together with the accompanying drawings. However, the present invention is not limited to exemplary embodiments disclosed herein but will be implemented in various different forms. The exemplary embodiments are provided by way of example only so that a person of ordinary skilled in the art can fully understand the disclosures of the present invention and the scope of the present invention. Therefore, the present invention will be defined only by the scope of the appended claims. Like reference numerals indicate like elements throughout the specification.

Accordingly, in some embodiments, well-known steps, known structures, and known technologies will not be described in detail in order to avoid the present invention from being ambiguously interpreted.

The terms used in the present specification are for explaining the embodiments rather than limiting the present invention. Unless particularly stated otherwise in the present specification, a singular form also includes a plural form. The word "comprises" and/or "comprising" used in the present specification will be understood to imply the inclusion of stated constituents, steps, and/or operations but not the exclusion of one or more of other constituents, steps, and/or operations. Further, "and/or" includes each of mentioned items and all combinations of one or more items.

A term including an ordinal number such as first or second which is used in the present specification may be used to explain components but the components are not limited by the terms. The above terms are used only for distinguishing one component from the other component.

Exemplary embodiments described in the specification will be explained with reference to perspective views, cross-sectional views, side views and/or schematic views which are ideal exemplary views of the present invention. Therefore, a shape of the exemplary view may be modified by a manufacturing technology and/or an allowable error. Accordingly, exemplary embodiments of the present invention are not limited to specific illustrated types but may include modified types which are generated in accordance with the manufacturing process. Further, constitutional elements in the drawings of the present invention may be enlarged or reduced in consideration of convenience of description.

Hereinafter, a camera image compensating apparatus for a vehicle according to an exemplary embodiment of the present invention will be described with reference to the accompanying drawings.

Figure 1A:
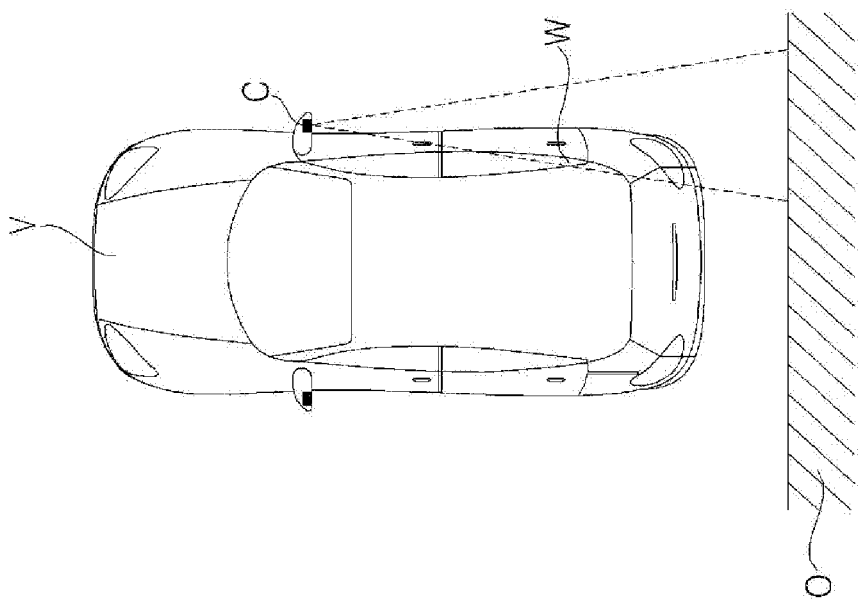

FIGS. 1A-1B illustrate an example of a vehicle V, a mounting position of a camera C, and an image which is captured by the camera C according to an exemplary embodiment of the present invention.

Referring to FIGS. 1A-1B, at least one camera C may be mounted in a vehicle V in which a camera image compensating apparatus 100 for a vehicle according to an exemplary embodiment of the present invention is provided. The camera C may be mounted in one region of the vehicle C. However, even for the cameras C having the same specification, a range of the image which is captured by the camera C may vary depending on the kind of vehicle, a design of the vehicle body, and the size of the vehicle.

As illustrated in FIG. 1A, a scene that a camera C which is mounted in a left side mirror of the vehicle V captures a left rear side of the vehicle V and an obstacle O which is located at the rear side of the vehicle V is checked. Even though in FIG. 1A, a four wheel sedan V is illustrated, the present invention is not limited thereto and may be applied to any device which is manufactured to be driven or perform a job, such as a two-wheeled vehicle or a train. Further, even though only a camera C which is mounted on a left side mirror is illustrated in FIG. 1A for convenience of description, the number or a position of the cameras C which are mounted in the vehicle V is not limited. For example, in the case of a vehicle in which the mirror system is mounted and no side mirrors are provided, the camera C may be mounted at one of the left and right sides of the vehicle body.

In FIG. 1B, an image which is captured by the camera C as illustrated in FIG. 1A is illustrated. Specifically, as the space including a left rear side of the vehicle V is captured by the camera C, a part of an obstacle O with a predetermined height which is located at the rear side of the vehicle V and a part of the vehicle body may be displayed in the image.

The description will be continued on the assumption that the image illustrated in FIG. 1B is an image which is captured when the camera C is precisely mounted in a designated position of the vehicle V so that no angular change occurs. A base line L which is located at a boundary of the obstacle O and a ground and a contour line K in accordance with an outline shape of the part of the vehicle body is checked from an image illustrated in FIG. 1B. First, a term 'the base line L' which is used in the present invention refers to a line (a straight line or a curve) which is present at the outside of the vehicle V and becomes a reference required to determine a predetermined positional relationship with a body contour line of the vehicle V. For example, an obstacle O illustrated in FIGS. 1A-1B is a representative object which is used to extract the base line L and the horizon or another vehicle V may be also used therefor.

In the meantime, a position of the camera C of the vehicle V may be changed from a mounting position designated when the camera C is mounted in the vehicle C due to a manufacturing tolerance and an assembling tolerance and thus there may be a small or big difference between an object to be measured and an actually captured image.

There may be a relative change in addition to an absolute change of the mounting position of the camera C. For example, even when the camera C is precisely mounted in a designated mounting position of the vehicle V, a part of the shape of the vehicle body is modified or a center of the vehicle V moves due to an accident, deterioration of the vehicle V, the number of passengers of the vehicle V, and a change of tire pressure. Therefore, there may be a small or large difference between an object to be captured and an actually captured image also in this case. Hereinafter, an apparatus for compensating for a change of a mounting angle of the camera C and an operating method thereof will be described in more detail with reference to FIGS. 2 to 7.

Figure 2:
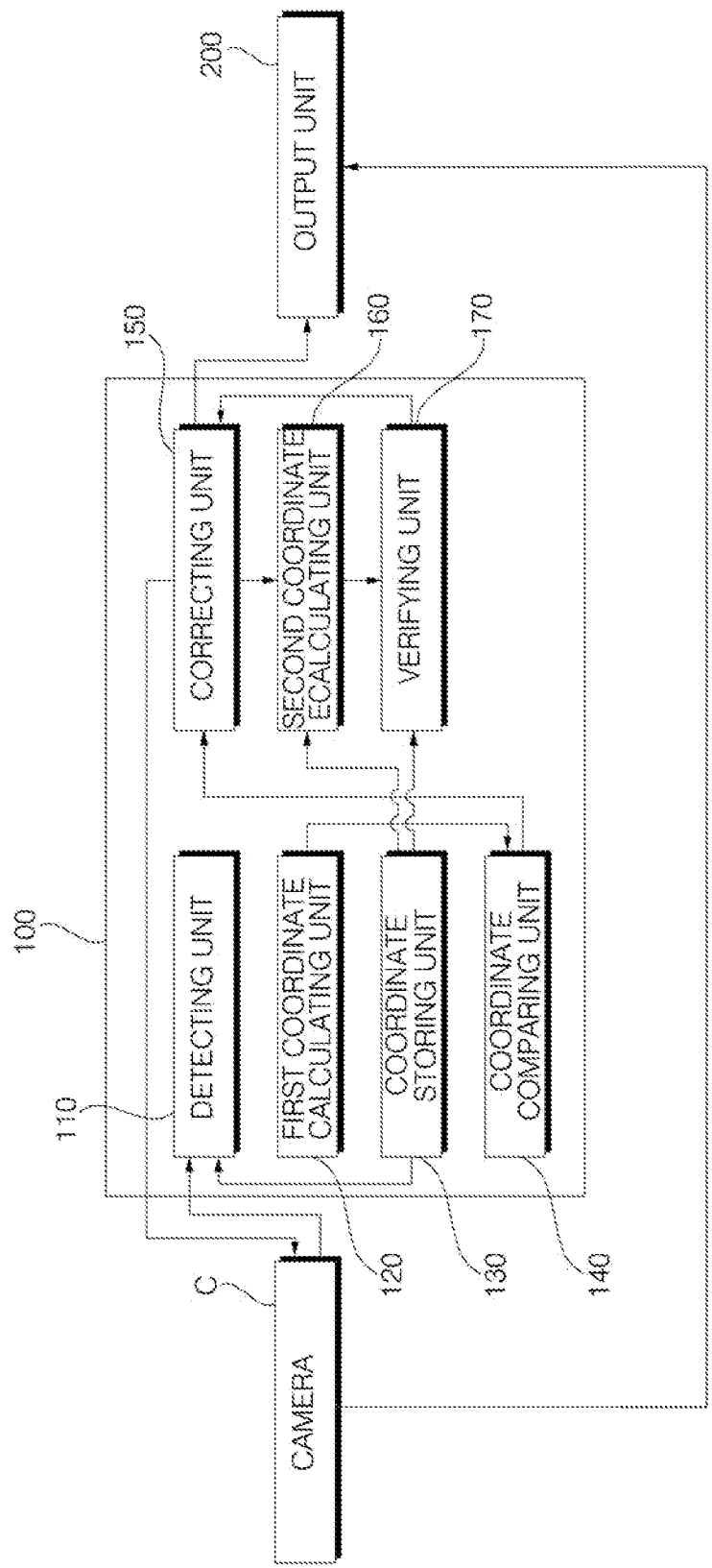
FIG. 2 is a block diagram schematically illustrating a configuration of a camera image compensating apparatus for a vehicle according to an exemplary embodiment of the present invention.

FIG. 2 is a block diagram schematically illustrating a configuration of a camera image compensating apparatus 100 for a vehicle according to an exemplary embodiment of the present invention and FIGS. 3A-3D illustrate a base line and a contour line of the vehicle body which may be detected by a camera image compensating apparatus 100 for a vehicle according to an exemplary embodiment of the present invention. In the meantime, a signal line of the block diagram illustrated in FIG. 2 is an example. That is, a part of signal lines may be omitted or more signal lines may be added in order to unidirectionally or bidirectionally transmit a signal between components.

Referring to FIG. 2, a camera image compensating apparatus 100 for a vehicle may include a detecting unit 110, a first coordinate calculating unit 120, a coordinate storing unit 130, a coordinate comparing unit 140, and a correcting unit 150. The camera image compensating apparatus 100 for a vehicle may further include a second coordinate calculating unit 160 or a second coordinate calculating unit 160 and a verifying unit 170.

The detecting unit 110 detects a base line L and a vehicle body contour line K by analyzing an image signal which is created by the camera C. The camera C uses a camera parameter which is stored in advance to create an image signal by transformation which projects a point in a three-dimensional space, which is a capturing object, onto a corresponding point in a two-dimensional plane. Here, the camera parameter is mainly divided into an external parameter and an internal parameter. The external parameter is a parameter including various information on a geometric relationship between the camera C and the external space such as a mounting height, a pan, and tilt. The internal parameter is a parameter including various information on a property of the camera C such as an aspect ratio, a focal length, a principal point, and a skew coefficient.

The detecting unit 110 may detect a contour line from the image signal using a known contour detecting algorithm such as a region based approach or an edge based approach. Specifically, the contour detecting algorithm including the horizon is a technical which is widely utilized not only in attitude control or position estimation of an aircraft but also in a lane recognition field so that a detailed description thereof will be omitted.

Figure 3A:
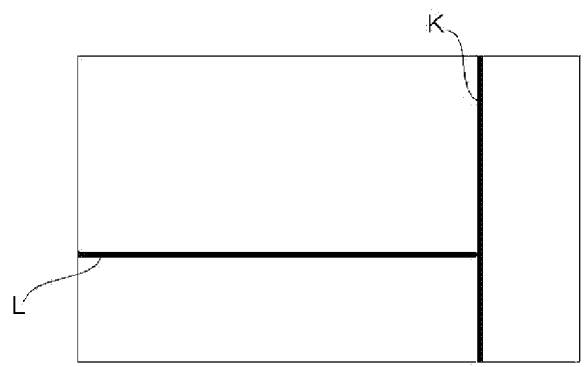
FIGS. 3A-3D illustrate a base line and a contour line of the vehicle body which may be detected by a camera image compensating apparatus for a vehicle according to an exemplary embodiment of the present invention.
Figure 3B:
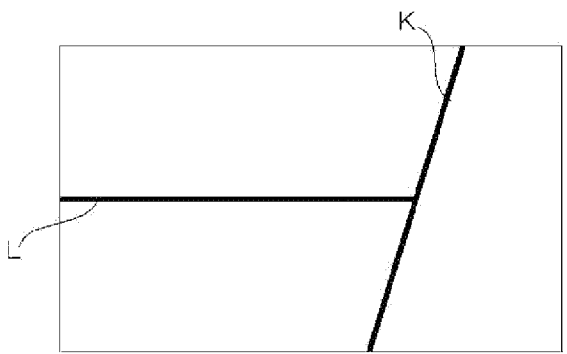
Figure 3C:
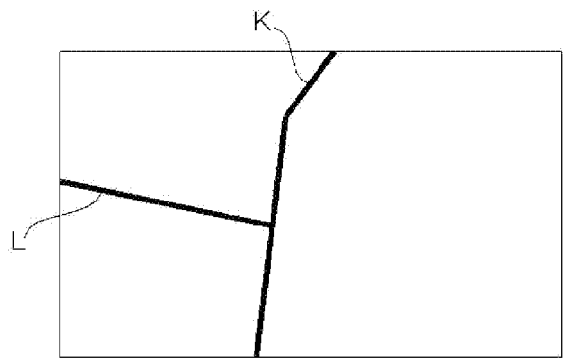
Figure 3D:

The base line L and the vehicle body contour line K may be straight lines which are orthogonal to each other as illustrated in FIG. 3A, the base line L and the vehicle body contour line K may be straight lines but may not be orthogonal to each other as illustrated in FIG. 3B, or the base line L and the vehicle body contour line K may be configured by straight lines and any one of the base line L and the vehicle body contour line K may be configured by a plurality of straight lines as illustrated in FIG. 3C. Further, at least one of the base line L and the vehicle body contour line K may be a curve as illustrated in FIG. 3D. In FIGS. 3A-3D, four types may be illustrated as a part of various types of the base line L and the vehicle body contour line K which may be detected by the detecting unit 110.

The first coordinate calculating unit 120 calculates a first base line image coordinate value with respect to the base line L detected by the detecting unit 110. Further, the first coordinate calculating unit 120 calculates a first vehicle body contour line image coordinate value with respect to the vehicle body contour line K. In this case, the first coordinate calculating unit 120 may calculate the first base line image coordinate value and the first vehicle body contour line image coordinate value by sampling the base line L and the vehicle body contour line K. A lower limit of the number of coordinates sampled from the base line L and the vehicle body contour line K is one and an upper limit thereof is not specifically limited.

The coordinate storing unit 130 stores a first reference image coordinate value and a second reference image coordinate value. Here, the first reference image coordinate value is a value which is stored in advance in order to be compared with the first base line image coordinate value. Specifically, the first reference image coordinate value may be a coordinate value with respect to the base line L of an image which is created by the camera C which is precisely mounted in a designated mounting position. Alternatively, the first reference image coordinate value may be a coordinate value with respect to a base line L which is obtained from an image signal which is created by the camera C which uses a camera parameter immediately before being corrected according to an exemplary embodiment of the present invention.

The second reference image coordinate value is a value which is stored in advance in order to be compared with the first vehicle body contour line image coordinate value. Specifically, the second reference image coordinate value may be a coordinate value with respect to the vehicle body contour line K of an image which is created by the camera C which is precisely mounted in a designated mounting position. Alternatively, the second reference image coordinate value may be a coordinate value with respect to a vehicle body contour line K which is obtained from the image signal which is created by the camera C which uses a camera parameter immediately before being corrected according to an exemplary embodiment of the present invention.

The coordinate comparing unit 140 calculates a first comparison result which is a result of comparing the first reference image coordinate value with the first base line image coordinate value. Further, the coordinate comparing unit 140 calculates a second comparison result which is a result of comparing the second reference image coordinate value with the first vehicle body contour line image coordinate value. Those skilled in the art may easily understood that the first and second comparison results may be results of comparing the difference between coordinate values and thus include information on a size of the difference and a sign.

The correcting unit 150 calculates angle change information of the camera C based on the first and second comparison results. The angle change information may include information on a size of an angle which is changed by a pitch, a yaw, and a roll, which will be separately described with reference to FIG. 4.

The correcting unit 150 calculates correction information based on the angle change information. The correction information is information for compensating for a change of an angle which is checked by the angle change information. For example, when it is determined that a mounting angle of the camera C is changed in an upward vertical direction by a first amount at a present time, the correcting unit 150 may calculate correction information which allows the present image to be downwardly changed in a vertical direction by the first amount. The correction information corresponding to the angle change information may be stored in a separate data table in advance.

The correction information may have a format which is applicable to the camera parameter. For example, when the camera parameter is in a matrix form, the correction information may also be calculated in a matrix form.

The correcting unit 150 corrects a camera parameter using the correction information. The corrected camera parameter may be reset as a reference camera parameter of the camera C and the detailed description will be separately made below.

The second coordinate calculating unit 160 applies the corrected camera parameter to the image signal created by the camera C to calculate a second base line image coordinate value with respect to the base line L. Simultaneously, the second coordinate calculating unit 160 applies the corrected camera parameter to the image signal created by the camera C to calculate a second vehicle body contour line image coordinate value with respect to the vehicle body contour line K.

The verifying unit 170 calculates a third comparison result which is a result of comparing the first reference image coordinate value with the second base line image coordinate value. Simultaneously, the verifying unit 170 calculates a fourth comparison result which is a result of comparing the second reference image coordinate value with the second vehicle body contour line image coordinate value.

Therefore, the verifying unit 170 may verify whether the difference in accordance with the third and fourth comparison results falls within a predetermined error range. That is, it is verified whether to compensate an image which is distorted due to an angle change so as to have only a difference from the image before the angle change is generated which is within a predetermined range as a result of correcting the camera parameter.

When the verifying unit 170 verifies that the difference in accordance with the third and fourth comparison results falls within the predetermined error range, the correcting unit 150 may reset the corrected camera parameter as a reference camera parameter of the camera C.

An output unit 200 receives the image signal from the camera C and visualizes the image signal. As an image display device such as a navigation device, a touch screen, or a portable terminal which communicates with the image compensating apparatus 100 in a wired or wireless manner, a device which displays data regarding an image may be used as the output unit 200. In the meantime, even though in FIG. 2, the camera C and the output unit 200 are illustrated as independent components from the image compensating apparatus 100 for the convenience of description, it should be understood that the camera C or the output unit 200 may be added as one of components of the image compensating apparatus 100 in some cases.

Figure 4:
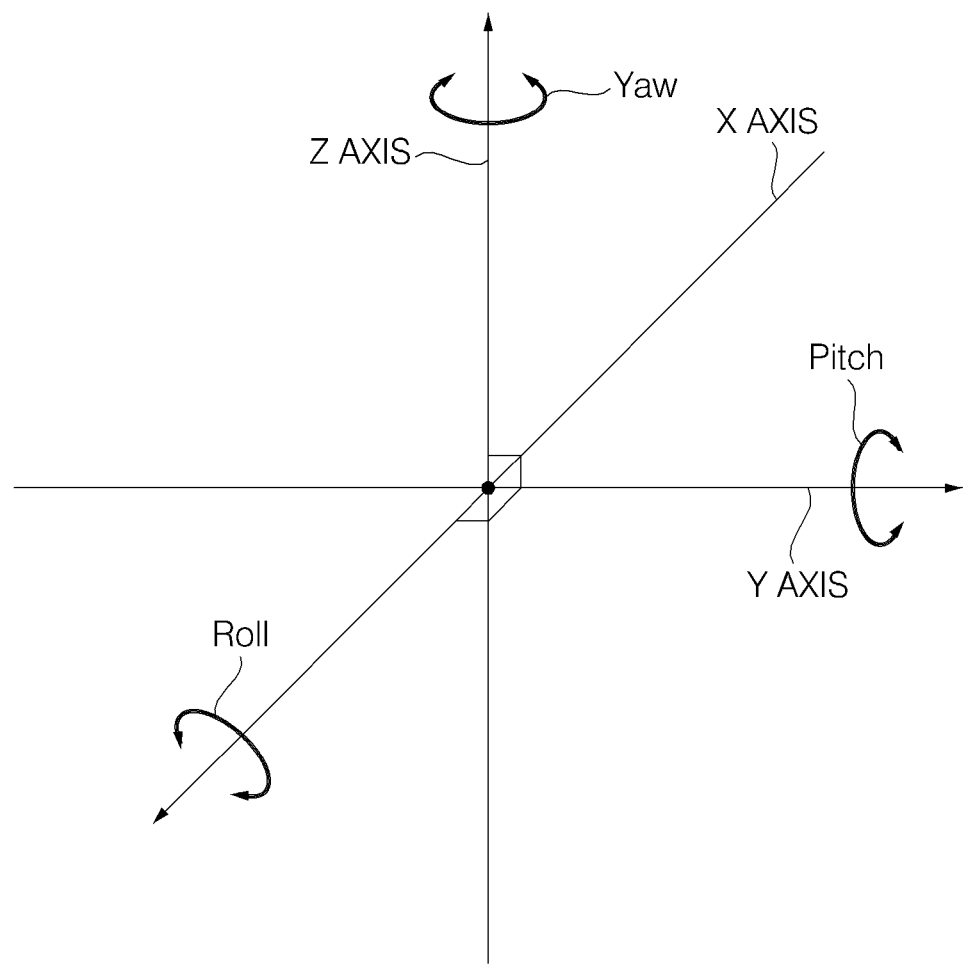
FIG. 4 illustrates types of angle change information which is recognized by a camera image compensating apparatus for a vehicle according to an exemplary embodiment of the present invention.

FIG. 4 illustrates types of angle change information which is recognized by a camera image compensating apparatus 100 for a vehicle according to an exemplary embodiment of the present invention.

Referring to FIG. 4, a three-dimensional coordinates system configured by an X axis, a Y axis, and a Z axis which are perpendicular to each other is checked. In the description, it is assumed that an optical axis of the camera C coincides with the X axis and a center of the camera C coincides with an origin of the coordinates system illustrated in FIG. 4. If the camera C rotates around the X axis, the image captured by the camera C also rotates so that it is determined that a roll angle is changed in this case. If the camera C rotates around the Y axis, the image captured by the camera C moves in a vertical direction so that it is determined that a pitch angle is changed in this case. If the camera C rotates around the Z axis, the image captured by the camera C moves in a horizontal direction so that it is determined that a yaw angle is changed in this case.

Figure 5A:
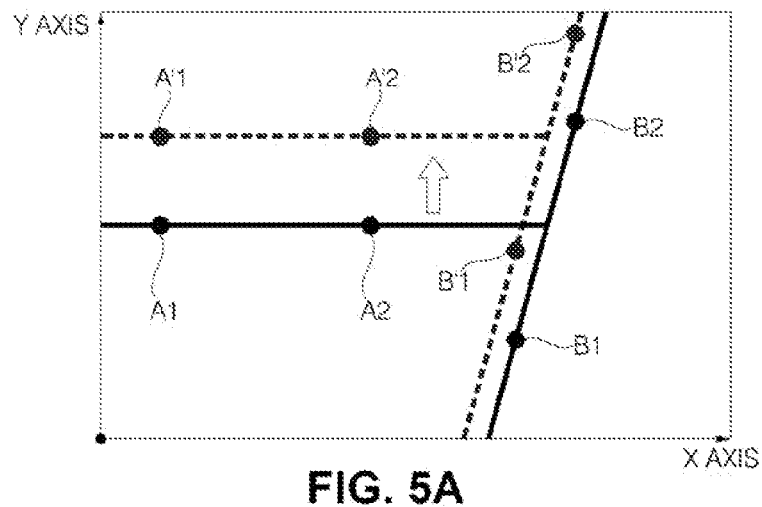
FIGS. 5A-5C illustrate three examples which distinguish the types of angle change information illustrated in FIG. 4.
Figure 5B:
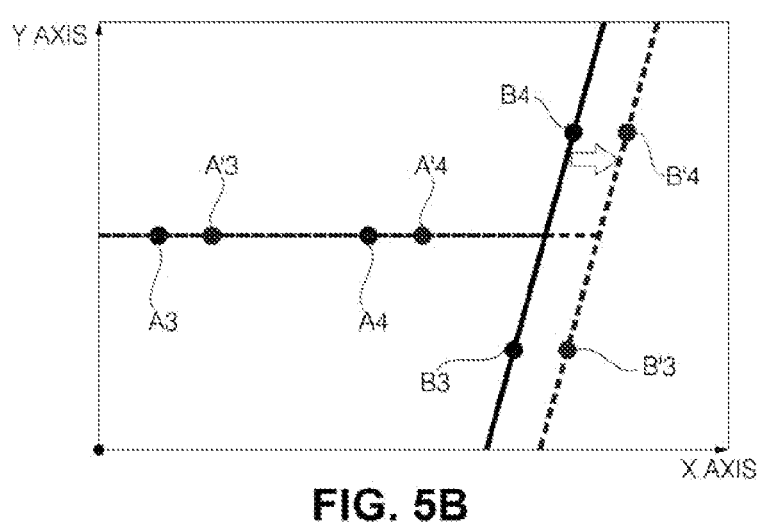
Figure 5C:
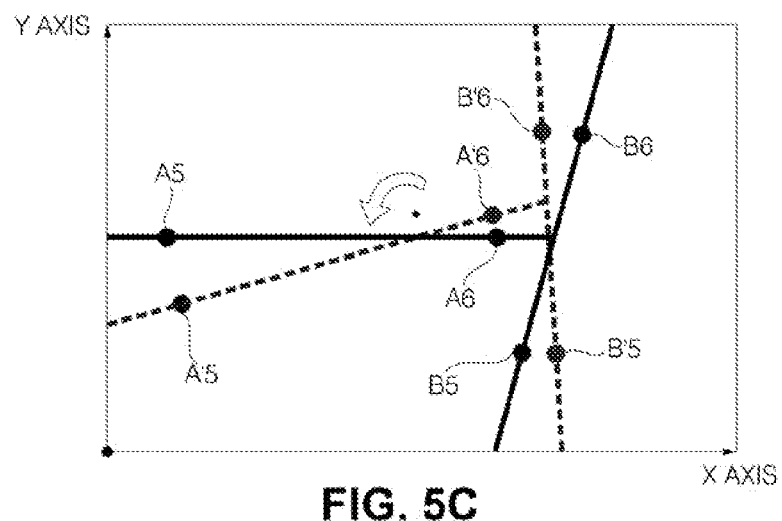

FIGS. 5A to 5C are views illustrating three examples which distinguish types of angle change information illustrated in FIG. 4. It has been described that the correcting unit 150 calculates the types of angle change information based on the first and second comparison results. For the convenience of description, a type in which an angle is changed with respect to the base line and the vehicle body contour line illustrated in FIG. 3B has been described. That is, when the description is made with reference to FIGS. 5A to 5C, it is assumed that the base line L and the vehicle body contour line K illustrated in FIG. 3B are for the first reference image coordinate value and the second reference image coordinate value. Further, it is assumed that two coordinates are calculated from each of the base line L and the vehicle body contour line K in FIGS. 5A to 5C.

First, referring to FIG. 5A, X axis values of two first reference image coordinate values ($A_1$, $A_2$) and two first base line image coordinate values ($A_1'$, $A_2'$) are the same and only Y axis values are different. Further, X axis values of two second reference image coordinate values ($B_1$, $B_2$) and two first vehicle body contour line image coordinate values ($B_1'$, $B_2'$) are the same and only Y axis values are different. Further, it is checked that a changing direction (a sign of a difference between the Y axis values) of the Y axis values is positive so that both changing directions are the same. That is, when comparing with the base line and the vehicle body contour line illustrated in FIG. 3B, the image which is currently being captured moves in an upward vertical direction. Therefore, the correcting unit 150 may determine that the pitch angle of the camera C is changed.

Next, referring to FIG. 5B, Y axis values of two first reference image coordinate values ($A_3$, $A_4$) and two first base line image coordinate values ($A_3'$, $A_4'$) are the same and only X axis values are different. Further, Y axis values of two second reference image coordinate values ($B_3$, $B_4$) and two first vehicle body contour line image coordinate values ($B_3'$, $B_4'$) are the same and only X axis values are different. Further, it is checked that a changing direction (a sign of a difference between the X axis values) of the X axis values is positive so that both changing directions are the same. That is, when comparing with the base line and the vehicle body contour line illustrated in FIG. 3B, the image which is currently being captured moves to be parallel to a left side. Therefore, the correcting unit 150 may determine that the yaw angle of the camera C is changed.

Next, referring to FIG. 5C, all X axis values and Y axis values of two first reference image coordinate values ($A_5$, $A_6$) and two first base line image coordinate values ($A_5'$, $A_6'$) are different and signs of the differences for the axes are not the same. Further, all X axis values and Y axis values of two second reference image coordinate values ($B_5$, $B_6$) and two first vehicle body contour line image coordinate values ($B_5'$, $B_6'$) are different and signs of the difference for the axes are not the same. In this case, the correcting unit 150 may determine that the mounting angle of the camera C is not changed in a vertical or horizontal direction but rotates around the optical axis in a clockwise direction or counterclockwise direction. Therefore, the correcting unit 150 may calculate a first direction (the clockwise direction or the counterclockwise direction) which is a rotation direction of a straight line corresponding to the first base line image coordinate value with respect to a straight line corresponding to the first reference image coordinate value. Further, the correcting unit 150 may calculate a second direction (the clockwise direction or the counterclockwise direction) which is a rotation direction of a straight line corresponding to the first vehicle body contour line image coordinate value with respect to a straight line corresponding to the second reference image coordinate value. When the first and second rotation directions are the same, the correcting unit 150 may determine that the roll angle of the camera C is changed.

Figure 6:
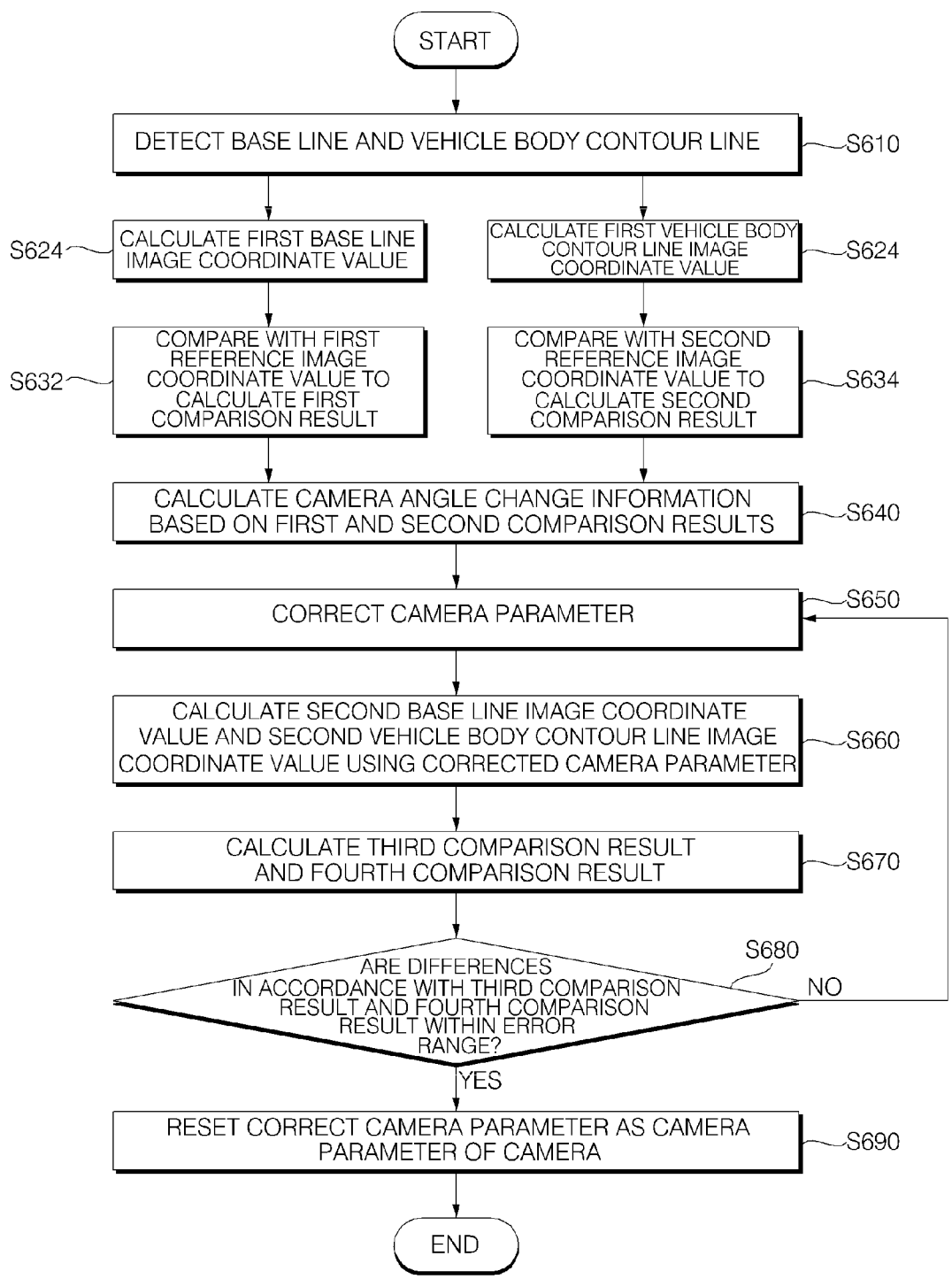
FIG. 6 sequentially illustrates an operating method of a camera image compensating apparatus for a vehicle according to an exemplary embodiment of the present invention.

FIG. 6 sequentially illustrates an operating method of a camera image compensating apparatus 100 for a vehicle according to an exemplary embodiment of the present invention.

Referring to FIG. 6, a detecting unit 110 detects a base line and a vehicle body contour line by analyzing an image signal which is created by a camera C which uses a predetermined camera parameter in step S610.

Next, a first coordinate calculating unit 120 calculates an image coordinate value in step S620. Specifically, the first coordinate calculating unit 120 calculates a first base line image coordinate value with respect to a base line in step S622 and calculates a first vehicle body contour line image coordinate value with respect to a vehicle body contour line in step S624.

Next, a coordinate comparing unit 140 calculates a comparison result between image coordinate values in step S630. The coordinate comparing unit 140 compares a first reference image coordinate value which has been stored in advance with the first base line image coordinate value to calculate a first comparison result in step S632 and compares a second reference image coordinate value which has been stored in advance with the first vehicle body contour line image coordinate value to calculate a second comparison result in step S634.

Next, the correcting unit 150 calculates angle change information of the camera C based on the first and second comparison results in step S640.

Next, the correcting unit 150 corrects a camera parameter using correction information corresponding to the angle change information in step S650.

Next, an operating method of a camera image compensating apparatus 100 for a vehicle may further include applying, by a second coordinate calculating unit 160, the corrected camera parameter to the image signal created by the camera C to calculate a second base line image coordinate value with respect to the base line L and a second vehicle body contour line image coordinate value with respect to the vehicle body contour line in step S660.

Next, an operating method of a camera image compensating apparatus 100 for a vehicle may further include comparing, by a verifying unit 170, the first reference image coordinate value and the second base line image coordinate value to calculate a third comparison result and compares the second reference image coordinate value and the second vehicle body contour line image coordinate value to calculate a fourth comparison result in step S670.

Next, an operating method of a camera image compensating apparatus 100 for a vehicle may further include verifying, the verifying unit 170, whether the differences in accordance with the third and fourth comparison results fall within a predetermined error range in step S680.

Next, an operating method of a camera image compensating apparatus 100 for a vehicle may further include when the verifying unit 170 verifies that the difference in accordance with the third and fourth comparison results falls within the predetermined error range, resetting, by the correcting unit 150 or the verifying unit 170, the corrected camera parameter as a reference camera parameter of the camera C in step S690.

Figure 7:
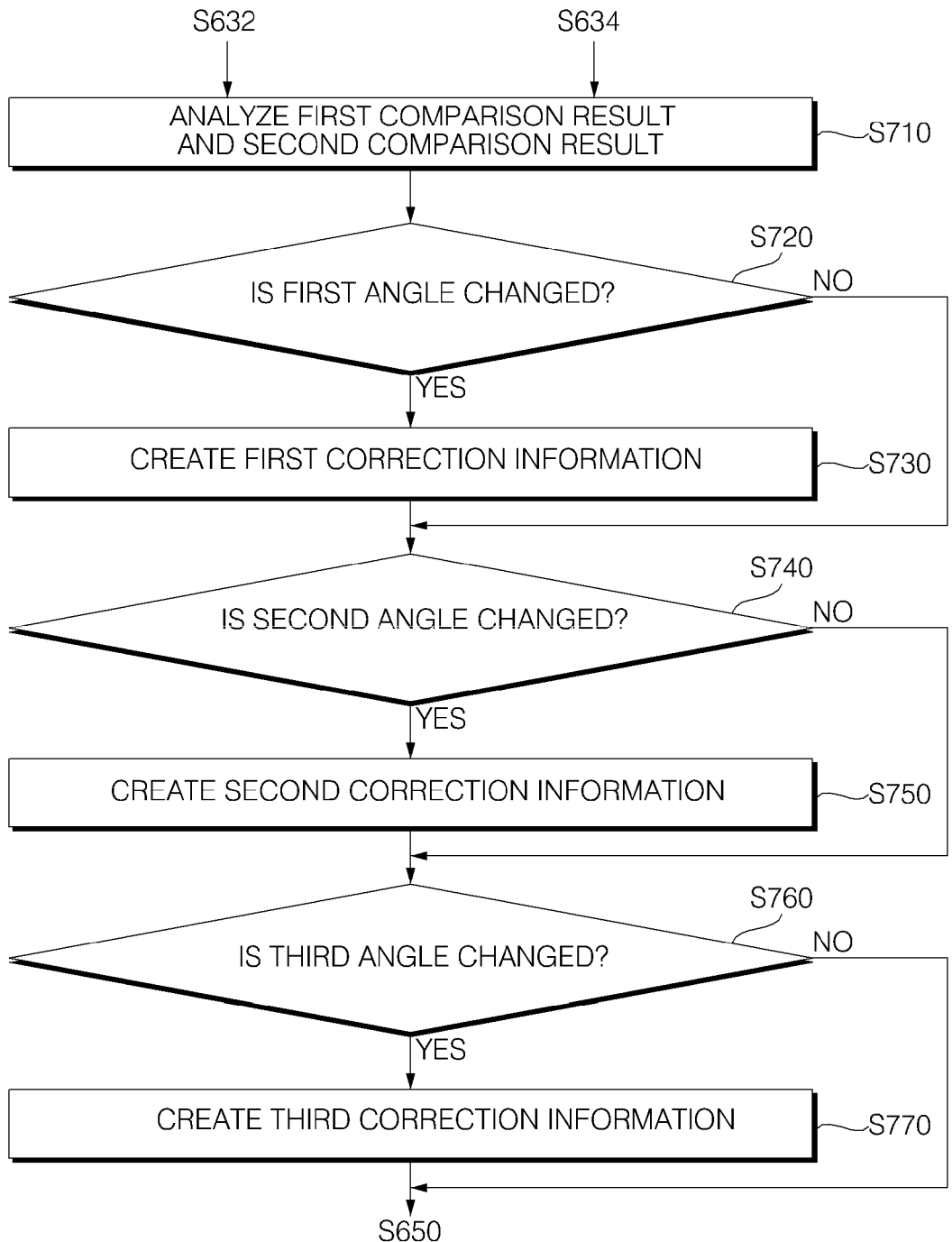
FIG. 7 illustrates a detailed data processing process which is included in calculating angle change information, according to an exemplary embodiment of the present invention.

FIG. 7 illustrates a detailed data processing process which is included in the angle change information calculating step S640, according to an exemplary embodiment of the present invention.

Referring to FIG. 7, according to the exemplary embodiment of the present invention, the types of angle change may include three types (pitch, yaw, and roll) so that a determining process to distinguish the three types needs to be performed in order to calculate correction information appropriate for the types.

First, the first comparison result and the second comparison result are analyzed to calculate information on a changed amount and a changing direction (that is, whether to be positive or negative) of one or more coordinate values for each of the base line and the vehicle body contour line in step S710.

Next, it is determined whether a first angle is changed based on the information calculated in step S710, in step S720. Here, the first angle may be a pitch angle. When it is determined that the pitch angle is changed, first correction information which is correction information for reversely compensating for the changed pitch angle is generated in step S730. In contrast, when it is determined that the pitch angle is not changed, the step of generating the first correction information may be omitted.

It is determined whether a second angle is changed in step S740. Here, the second angle may be a yaw angle. When it is determined that the yaw angle is changed, second correction information which is correction information for reversely compensating as much as the yaw angle which is changed is generated in step S750. In contrast, when it is determined that the yaw angle is not changed, the step of generating the second correction information may be omitted.

It is determined whether a third angle is changed in step S760. Here, the third angle may be a roll angle. When it is determined that the roll angle is changed, third correction information which is correction information for reversely compensating for the changed roll angle is generated in step S770. In contrast, when it is determined that the roll angle is not changed, the step of generating the third correction information may be omitted.

Accordingly, the correcting unit 150 may correct the camera parameter using at least one of the first to third correction information in step S650.

In the meantime, FIG. 7 illustrates that it is sequentially and individually determined whether the pitch angle, the yaw angle, and the roll angle are changed, but this is merely an example. That is, the order of determining whether the first to third angles are changed is not limited to FIG. 7 but it should be understood that it may be simultaneously determined whether the first to third angles are changed or it may be determined only whether two or less of the pitch angle, the yaw angle, and the roll angle are changed.

The camera image compensating apparatus for a vehicle and an operating method thereof of the present invention has been described with reference to the exemplary embodiment of the present invention, but those skilled in the art will understand that the present invention may be implemented in other specific forms without changing the technical spirit or an essential feature thereof.

Thus, it is to be appreciated that embodiments described above are intended to be illustrative in every sense, and not restrictive. The scope of the present invention is represented by the claims to be described below rather than the detailed description, and it is to be interpreted that the meaning and scope of the claims and all the changes or modified forms derived from the equivalents thereof come within the scope of the present invention.

What is claimed is:

1. A camera image compensating apparatus for a vehicle, comprising:
   a detecting unit which detects a base line and a vehicle body contour line by analyzing an image signal which is created by a camera which uses a predetermined camera parameter;
   a coordinate storing unit which stores a first reference image coordinate value and a second reference image coordinate value;
   a first coordinate calculating unit which calculates a first base line image coordinate value with respect to the base line and calculates a first vehicle body contour line image coordinate value with respect to the vehicle body contour line;
   a coordinate comparing unit which compares the first reference image coordinate value and the first base line image coordinate value to calculate a first comparison result and compares the second reference image coordinate value and the first vehicle body contour line image coordinate value to calculate a second comparison result;
   a correcting unit which calculates angle change information of the camera based on the first and second comparison results, calculates correction information based on the angle change information, and corrects the camera parameter using the correction information; and
   a second coordinate calculating unit which calculates a second base line image coordinate value with respect to the base line and calculates a second vehicle body contour line image coordinate value with respect to the vehicle body contour line by applying the corrected camera parameter to the image signal created by the camera.

2. The apparatus of claim 1, further comprising:
   a verifying unit which compares the first reference image coordinate value and the second base line image coordinate value to calculate a third comparison result, compares the second reference image coordinate value and the second vehicle body contour line image coordinate value to calculate a fourth comparison result, and verifies whether differences in accordance with the third and fourth comparison results fall within a predetermined error range.

3. The apparatus of claim 2, wherein when the verifying unit verifies that the differences in accordance with the third and fourth comparison results fall within the predetermined error range, the correcting unit resets the corrected camera parameter as a camera parameter of the camera.

4. The apparatus of claim 1, wherein when a difference between Y axis values of the first reference image coordinate value and the first base line image coordinate value in accordance with the first comparison result and a difference between Y axis values of the second reference image coordinate value and the first vehicle body contour line image coordinate value in accordance with the second comparison result have the same sign, the correcting unit determines that a pitch angle of the camera is changed.

5. The apparatus of claim 1, wherein when a difference between X axis values of the first reference image coordinate value and the first base line image coordinate value in accordance with the first comparison result and a difference between X axis values of the second reference image coordinate value and the first vehicle body contour line image coordinate value in accordance with the second comparison result have the same sign, the correcting unit determines that a yaw angle of the camera is changed.

6. The apparatus of claim 1, wherein the correcting unit calculates a first direction which is a rotating direction of a straight line corresponding to the first base line image coordinate value with respect to a straight line corresponding to the first reference image coordinate value based on the first comparison result and calculates a second direction which is a rotating direction of a straight line corresponding to the first vehicle body contour line image coordinate value with respect to a straight line corresponding to the second reference image coordinate value based on the second comparison result.

7. The apparatus of claim 6, wherein when the first and second rotating directions are the same, the correcting unit determines that the roll angle of the camera is changed.

8. An operating method of a camera image compensating apparatus for a vehicle, comprising:
   detecting a base line and a vehicle body contour line by analyzing an image signal which is created by a camera which uses a predetermined camera parameter;
   calculating a first base line image coordinate value with respect to the base line and calculating a first vehicle body contour line image coordinate value with respect to the vehicle body contour line;
   comparing a first reference image coordinate value which has been stored in advance with the first base line image coordinate value to calculate a first comparison result and comparing a second reference image coordinate value which has been stored in advance with the first vehicle body contour line image coordinate value to calculate a second comparison result;
   calculating angle change information of the camera based on the first and second comparison results;
   correcting the camera parameter using correction information corresponding to the angle change information; and
   calculating a second base line image coordinate value with respect to the base line and calculating a second vehicle body contour line image coordinate value with respect to the vehicle body contour line by applying the corrected camera parameter to the image signal created by the camera.

9. The method of claim 8, further comprising:
   comparing the first reference image coordinate value and the second base line image coordinate value to calculate a third comparison result and comparing the second reference image coordinate value and the second vehicle body contour line image coordinate value to calculate a fourth comparison result; and
   verifying whether differences in accordance with the third and fourth comparison results fall within a predetermined error range.

10. The method of claim 9, further comprising:
    resetting the corrected camera parameter as a camera parameter of the camera when it is verified that the differences in accordance with the third and fourth comparison results fall within the predetermined error range.

11. The method of claim 8, wherein the calculating of angle change information determines that a pitch angle of the camera is changed when a difference between Y axis values of the first reference image coordinate value and the first base line image coordinate value in accordance with the first comparison result and a difference between Y axis values of the second reference image coordinate value and the first vehicle body contour line image coordinate value in accordance with the second comparison result have the same sign.

12. The method of claim 8, wherein the calculating of angle change information determines that a yaw angle of the camera is changed when a difference between X axis values of the first reference image coordinate value and the first base line image coordinate value in accordance with the first comparison result and a difference between X axis values of the second reference image coordinate value and the first vehicle body contour line image coordinate value in accordance with the second comparison result have the same sign.

13. The method of claim 8, wherein the calculating of angle change information calculates a first direction which is a rotating direction of a straight line corresponding to the first base line image coordinate value with respect to a straight line corresponding to the first reference image coordinate value based on the first comparison result and calculates a second direction which is a rotating direction of a straight line corresponding to the first vehicle body contour line image coordinate value with respect to a straight line corresponding to the second reference image coordinate value based on the second comparison result.

14. The method of claim 13, wherein the calculating of angle change information determines that the roll angle of the camera is changed when the first and second rotating directions are the same.

* * * * *